United States Patent
Xiao et al.

(10) Patent No.: US 7,637,511 B2
(45) Date of Patent: Dec. 29, 2009

(54) METHOD AND SYSTEM FOR ELECTRONIC SHOCK ABSORBING BY ADJUSTING THE RETRACTILE STATUS OF A RETRACTABLE ABSORBER

(76) Inventors: Guo Xiao, No. N14 Xiangya Court Hongli Road, Futian District, Shenzhen, Guangdong Province 518034 (CN); Dongping Xiao, No. N14 Xiangya Court Hongli Road, Futian District, Shenzhen, Guangdong Province 518034 (CN)

( * ) Notice: Subject to any disclaimer, the term of this patent is extended or adjusted under 35 U.S.C. 154(b) by 583 days.

(21) Appl. No.: 11/278,598

(22) Filed: Apr. 4, 2006

(65) Prior Publication Data

US 2006/0226611 A1 Oct. 12, 2006

(30) Foreign Application Priority Data

Apr. 6, 2005 (CN) ................... 2005 1 0034065

(51) Int. Cl.
*B60G 21/045* (2006.01)
(52) U.S. Cl. .................................... 280/5.506
(58) Field of Classification Search .............. 280/5.5, 280/5.506, 5.507, 5.508, 124.106, 124.107, 280/5.514
See application file for complete search history.

(56) References Cited

U.S. PATENT DOCUMENTS 5,193,845 A * 3/1993 Yokote et al. ............ 280/5.503
7,430,468 B2 * 9/2008 Salib et al. .................... 701/70

* cited by examiner

*Primary Examiner*—Faye M. Fleming
(74) *Attorney, Agent, or Firm*—Global IP Services; Tianhua Gu

(57) ABSTRACT

The present invention provides a method and system for electronic shock absorbing by adjusting the retractile status of a retractable absorber, wherein an acceleration sensor is fixed on a vehicle body at a predetermined direction and angle to detect the signal of acceleration vectors both along the vertical direction and along the longitudinal and transverse direction of the vehicle, and then transmit the signal to an information processing and controlling device to set the retractile status of the retractable absorber to realize shock absorbing. By the method or system of this invention, the nutation or lift of the vehicle can be decreased when starting or braking, the list can be decreased also when the vehicle is turning as the system can voluntarily adjust the burthen on the right and left sides of the wheels, and the impact to the wheels by the bumpy road and the noise thereof can be reduced too; at the same time, when the vehicle is turning, a safety list will arise and the highness of the vehicle can be adjusted by the power of oscillation between the wheels and the body of the vehicle, thus the security and passing ability of the vehicle is improved.

6 Claims, 3 Drawing Sheets

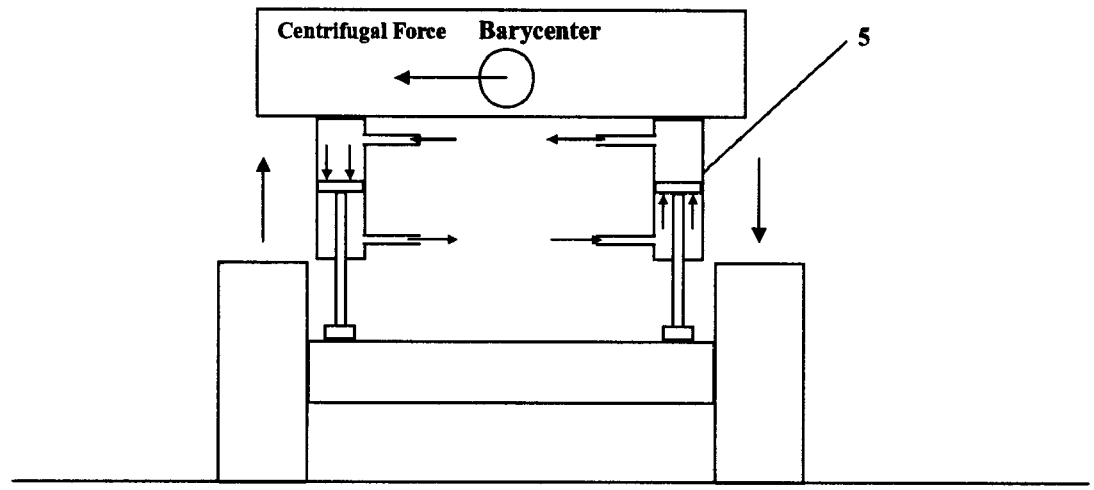
*Fig. 5*
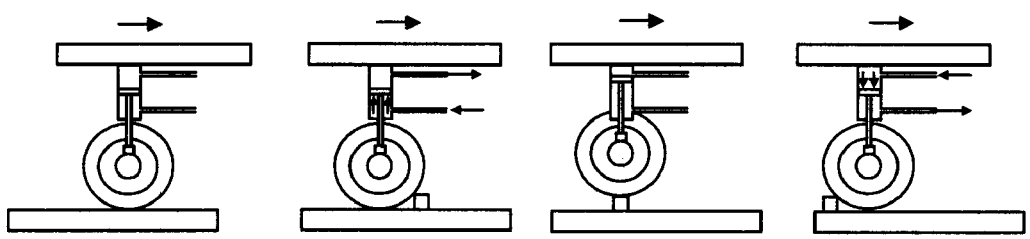
*Fig. 6*  *Fig. 7*  *Fig. 8*  *Fig. 9*

METHOD AND SYSTEM FOR ELECTRONIC SHOCK ABSORBING BY ADJUSTING THE RETRACTILE STATUS OF A RETRACTABLE ABSORBER

CROSS REFERENCE TO RELATED PATENT APPLICATIONS

This application claims the priority benefit of the Chinese patent application No. CN200510034065.9 filed on Apr. 6, 2005.

BACKGROUND OF THE INVENTION

1. Field of the Invention

The present invention relates to technologies of shock absorbing for a vehicle, more particularly, it is relates to a method and system for shock absorbing by adjusting the retractile status of a retractable absorber according to the conditions of the road surface, and by automatically adjusting the relative space between the wheels and the body of a vehicle utilizing the power of the vibration between such wheels and body.

2. Description of Prior Art

The shock absorbing system in the prior art is always using spring and damper, in practice, in order to reduce the shake of the vehicle that caused by the bumpy road surface and to decrease the noise, the elasticity and damping of the spring is modulated a little soft to make the vehicle more comfortable. But the soft spring makes the vehicle easy to list when turning and easy to drop when braking, and the lower damping make the vehicle easy to wobble, therefore diminish safety of the vehicle. Accordingly, most racing cars utilize hard spring with higher damping, but the comfortability is decreased. On the other hand, if want to improve safety, the barycenter of the vehicle should be little lower and the space between the chassis and the ground should be little narrower, but this will effect the passing ability of the vehicle. When a vehicle is in designing, a compromise should be considered from the safety, comfortability and passing ability, in most instances, the vehicles have sacrificed some passing ability and comfortability to ensure higher safety.

In order to increase the shock absorbing ability, there has one kind of electronic controlled proactive suspension shock absorbing system; with this system, the damping of the absorbing system can be dynamically adjusted during running, thus to make the vehicle more comfortable. For example, several acceleration sensors can be fixed above the wheels on the body of the vehicle, if one sensor detected the variation of the acceleration on the vertical direction has increased, the system will reduce the damping of the absorber in relative to the wheel; contrarily, the damping will increase. By this way, both the wallop of the vehicle on a bumpy road and the wobble of the vehicle on a flat road will be decreased when the vehicle running straight, but this way also causes some problems, which is, the list of the vehicle when turning is increased, the drop is intense when braking, and the vehicle is more easier to nutation or lift when starting or accelerating. The reasons are that under these situations, the variation of the acceleration detected by the sensors is increased so that the damping of the absorber is reduced, thereby the list, drop and nutation or lift of the vehicle are intense. In order to overcome such defects, a speed sensor are needed used for both detecting the speed and calculating the gradient of the vehicle body, and a turning angle sensor should be added to detect the list of the vehicle body, also a braking force sensor added to detect the braking force signal to solve the matter of drop, and a throttle position sensor or accelerator pedal sensor added to detect the acceleration signal to solve the matter of nutation or lift. As these signals are all transmitted to a computer controller, it is very difficult for the computer to calculate and process the information and respond all the requests at the same time. For example, when turning, the damping should be increased to decrease the list, but if at the same time the vehicle is running on a bumpy road, the damping should be reduced to decrease the wallop, at this moment, the conflict occurred and it is very hard to determine whether the damping should be increased or decreased.

There's a better shock absorbing method to overcome both the defects of the traditional shock absorbing technology that using a fixed shock absorbing mode and the defects of the foresaid electronic controlled proactive suspension shock absorbing system, by this way, the shock along the vertical direction of the vehicle can be removed or reduced to ensure safe and comfortable driving in any conditions, and with good passing ability. This shock absorbing method is realized by the following technology: a proactive intelligent electronic shock absorbing method, comprising the steps of, detecting whether the highness of the vehicle is a desired highness by a highness sensor, if not, slowly adjusting the relative wheel lift device to regulate the vehicle to said desired highness; detecting the variation of the up or down acceleration of the vehicle by a acceleration sensor according to different road conditions; controlling the wheel lift device on the wheel by a information processing and controlling device based on signals transmitted from the acceleration sensor to adjust the relative space between the wheel and the vehicle body to keep the vehicle stable, thus to make the variation of the acceleration on vertical direction of the vehicle to keep or incline to zero. Traditionally, the wheel lift device need outside force such as hydraulic pressure or air pressure to drive, that is, it will exhaust additional power of the vehicle; this construction will raise the complexity and cost of the system on one hand, and will exhaust considerable power of the vehicle under specific conditions on the other hand, thus limited the application of the technology.

SUMMARY OF THE INVENTION

The object of the present invention is to provide a method and system for electronic shock absorbing by using electronic signal to adjust the retractile status of a retractable shock absorbing device; this method/system only need to fix an acceleration sensor on the vehicle with predetermined direction and angle, then controlling the retractile status of the retractable shock absorbing device based on the amount and positive or negative of the signal variation of the acceleration sensor, thus realizing shock absorbing. The method/system can keep the vehicle with stable condition, greatly reduce the shock of the vehicle when running, and overcome the defects of nutation or lift when the vehicle is starting and braking, and harmful list when turning; and this method/system further can ensure comfortability, passing ability and safety of the vehicle by selecting different spaces between vehicle body and the ground.

As the variation trends and weighting factors of each acceleration vector depend on the direction and angle to fix the acceleration sensor, the undermentioned principle should be followed: for example, for the sensor installed above the front left wheel on the vehicle body, the selected direction should make the acceleration variation of the vehicle when down acceleration occurred (such as when the vehicle is running on a flat road, the front left wheel fall into a pothole suddenly) conform with the acceleration variation trend of the vehicle (for example, both of the acceleration variations are negative) when speed-down (for example, braking suddenly) or the vehicle body accelerate on the right side (such as the vehicle turn right or list to left), this is because under these situations, the relative shock absorbing device should always enhance the supporting force, namely, the absorbing device will elongate but not shorten. Similarly, when the vehicle accelerate suddenly or turn left or the front left wheel pass by a convex roadblock, the acceleration variation detected by the sensor is positive, the relative shock absorbing device should always reduce the supporting force, namely, the absorbing device will shorten but not elongate. When selecting the installation direction of the sensor based on the above foresaid principle, if in a 3D Coordinate System, axes Z represents vertical direction that plumb with the ground level, axes X represents east and axes Y represents north, then the acceleration sensor above the front left wheel is fixed adown and partial to northwest, the sensor above the front right wheel is fixed adown and partial to northeast, the sensor above the back left wheel is fixed adown and partial to southwest, and the sensor above the back right wheel is fixed adown and partial to southeast.

One object of the present invention is to provide a method for electronic shock absorbing by controlling the retractile status of a retractable absorber, comprising the steps of:

S1: fixing an acceleration sensor at a predetermined direction and angle on a vehicle body position that above the absorber, then detecting the resultant vector of the acceleration vector along the vertical direction and the acceleration vector along the longitudinal and transverse directions of the vehicle body above the absorber during running;

S2: processing the signal from the acceleration sensor by an information processing and controlling device (IPCD), and setting the retractile status of the retractable absorber according to the processing result;

S3: according to the retractile status set in S2, adjusting the retractable absorber to keep the variation of the acceleration retaining or trending to zero.

Advantageously, in step S2 of the above method, if the signal transmitted from the acceleration sensor shows the acceleration variation is positive, the retractile status of the retractable absorber is set to shorten; if the signal from the acceleration sensor shows the acceleration variation is negative, the retractile status of the retractable absorber is set to elongate; and if the signal from the acceleration sensor shows the acceleration variation retains or trends to zero, the retractile status of the retractable absorber is set to un-shorten and un-elongate.

Advantageously, said step S1 further comprising the step of fixing a highness sensor on the vehicle body to detect the variation signal of highness of the vehicle; and then in step S2, if the signal from the acceleration sensor shows the acceleration variation retains or trends to zero, the IPCD slowly sets the retractile status of the retractable absorber according to the acceleration signal and the highness signal and adjusts the retractile length of the retractable absorber utilizing the power of vibration between the wheels and the vehicle body to keep the vehicle with required highness.

Advantageously, the retractable absorber is set to only shorten by getting through the down check valve of a three-position two-way electromagnetic valve inside the retractable absorber; the retractable absorber is set to only elongate by getting through the up check valve of the three-position two-way electromagnetic valve; and the retractable absorber is set to un-shorten and un-elongate by setting the three-position two-way electromagnetic valve to block its channels.

Advantageously, the method further comprising step S4: controlling the retractile status of the retractable absorber by the IPCD to absorb the shock of a vehicle, thus to avoid or decrease the harmful list and nutation or lift, at the same time adjusting the retractile length of the retractable absorber utilizing the power of vibration between the wheels and the vehicle body to realize the adjustment of the highness and inclination of the vehicle.

Advantageously, said step S1 further comprising the step of fixing a highness sensor on the vehicle body to detect the variation signal of highness of the vehicle, and then in step S4, the shock absorbing is achieved by, transmitting the vehicle highness signal from the highness sensor to the IPCD, then the IPCD adjusting the retractile status of the retractable absorber, and at the same time, adjusting the retractile length of the retractable absorber utilizing the power of vibration between the wheels and the vehicle body, thereby the highness and gradient of the vehicle is adjusted; or the shock absorbing is achieved by, further fixing a speed sensor on the vehicle to detect the speed signal in step S1, then transmitting the speed signal to the IPCD to adjust the retractile status of the retractable absorber according to the road condition information expressed by the speed signal and the acceleration signal, and at the same time, adjusting the retractile length of the retractable absorber by the power of vibration between the wheels and the vehicle body to adjust the highness of the vehicle automatically.

Another object of the present invention is to provide a system for electronic shock absorbing by adjusting the retractile status of a retractable shock absorbing device, said system comprising an acceleration sensor fixed on a vehicle body, wherein the system further comprising a retractable shock absorbing device that connecting with both the body and the wheels of the vehicle, and an IPCD to control the retractile status of the retractable shock absorbing device; the acceleration sensor is fixed above the shock absorbing device, and the shock absorbing device is driven by the power of vibration between the wheels and the vehicle body.

Advantageously, the retractable shock absorbing device comprises an cylinder extension device, which includes air cylinder extension device, or hydraulic extension device, or hydro-pneumatic extension device; a three-position two-way electromagnetic valve that connected with the upper and lower outlets of the cylinder extension device, and a plurality of check valves with different pass directions respectively deposited in the channels of the electromagnetic valve.

Advantageously, the electronic shock absorbing system further comprises a highness sensor fixed on the body of the vehicle to detect the highness of the vehicle and transmit a highness signal to the IPCD, then the IPCD adjust the shorten or elongate status of the retractable shock absorbing device, and the retractile length of the shock absorbing device is adjusted by the power of vibration between the wheels and the body of the vehicle to keep the vehicle with required highness.

Advantageously, the electronic shock absorbing system further comprises a speed sensor fixed on the vehicle to detect the speed signal, wherein the speed sensor transmits the speed signal to the IPCD, then the IPCD adjusts the shorten or elongate status of the retractable shock absorbing device according to the speed signal and the acceleration signal, and the retractile length of the retractable absorber is adjusted by the power of vibration between the wheels and the body of the vehicle to automatically make the vehicle to choose a lower highness when running with high speed and to choose a higher highness when running on a bumpy road.

In accordance with the method and system for electronic shock absorbing in the present invention, the traditional damping device is replaced by a retractable shock absorbing device, no extra power of the vehicle is needed to drive the compressor of the liquid or air pressure system, the shock can be absorbed by detecting and processing the signal of acceleration variation, and adjusting the retractile status of the shock absorbing device according to the signal, therefore to keep the balance of the vehicle and to reduce the noise inside the vehicle, and at the same time, diminish the nutation or lift when the vehicle is starting or braking; and when the vehicle is turning, the system will adjust the burthen of the wheels on both right side and left side forwardly, thus to avoid or decrease harmful list of the vehicle; the system further can use the power of vibration between the wheels and the body of the vehicle to cause the body inclining to increase comfortability and safety when the vehicle is running on a crooked road; and the system can also use the power of vibration between the wheels and the body of the vehicle to dynamically adjust the relative space between the wheels and the body of the vehicle (namely, raising or lowering the vehicle body), thus to keep the required highness of the vehicle and increase the safety or passing ability of the vehicle when running.

In accordance with the method and system for electronic shock absorbing of the present invention, the IPCD can identify the real-time moving status of the vehicle based on the amount and direction of the variation of the acceleration signal on the vehicle body above the corresponding wheels detected by the acceleration sensors, e.g., when the vehicle running on a straight and flat road, the detected variation of the acceleration signals from each sensor are trend to zero; when the vehicle is in starting or accelerating, the value and direction of the detected variation of the acceleration signal are positive on front wheels and negative on rear wheels; when braking, negative on front wheels and positive on rear wheels; when turning left, positive on left wheels and negative on right wheels; when turning right, negative on left wheels and positive on right wheels; if great variation occurs to the acceleration signal from some acceleration sensor, this means the wheel corresponding to the acceleration sensor is running on a concave road (the variation of the acceleration is negative) or convex road (the variation of acceleration is positive). The IPCD will set the corresponding retractile status of the shock absorbing device according to the negative or positive values of the acceleration variation, that is, if the values are positive, the shock absorbing device is set to only elongate; if the values are negative, the shock absorbing device is set to only shorten; if the values are trend to zero, the shock absorbing device is set to un-shorten and un-elongate, or, based on the signal from the highness sensor, slowly set the retractile status of the shock absorbing device and adjust the retractile length of the shock absorbing device by the power of vibration between the wheels and the body of the vehicle, to adjust the highness of the vehicle. With the system/method of the present invention, whether the road is flat or not, whether the vehicle is in starting or braking, whether the vehicle is turning or not, or on the combined conditions of above all, the vehicle will have good ability of shock absorbing, the chance of tire blowout and the impact on the tires by the road is reduced, and the ability of anti-list is improved to increase the stability, security, and comfortability.

BRIEF DESCRIPTION OF THE DRAWINGS

The present invention will detail described in according with the drawings and preferred embodiments as below.

FIG. 5 is the sketched diagram of the shock absorbing device working when the vehicle is turning right.

FIG. 6 to FIG. 9 illustrate the working steps of the shock absorbing device when the wheel running against a roadblock.

DETAILED DESCRIPTION OF THE INVENTION

Figure 1:
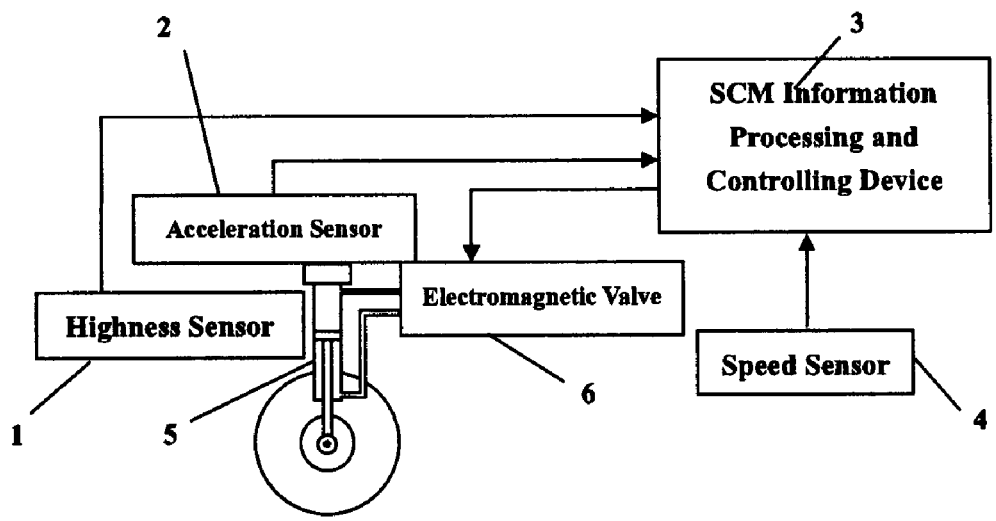
FIG. 1 is the structure showing of the shock absorbing system that fixed on one wheel of the vehicle.

FIG. 1 shows the structure of the shock absorbing system fixed on one wheel; other wheels have the same configuration. The structure and working principle of the system is illustrated by example of traditional wagon. In accordance with the shock absorbing system of the present invention, four retractable absorbing devices (the spring does not shown in the drawing, as whether the vehicle will list or not depends on the retractile length or status of the absorbing device, it has few matter with the length or flexibility of the spring, so springs with longer length and lower flexibility will have better shock absorbing effect and broader adjusting range of highness of the vehicle) is fixed on the wagon, respectively replacing four spring-dashpots on the four wheel, based on the existing spring and damping suspension system. The system of the present invention further has a sensing device which comprises four vehicle highness sensors 1 corresponding to each wheel to detect the relative space between the wheel and body of the vehicle, four acceleration sensors 2 and a speed sensor 4; the acceleration sensors 2 are fixed above each wheel on the body at a predetermined direction and angle respectively; the retractable absorbing device and the sensing device are connected with a SCM (Single Chip Micyoco) IPCD 3 (of course, the processing device can be any system other than SCM).

As the direction and angle of the acceleration sensor determines the change trend and weighting factor of each acceleration vector, the fixation should follow the undermentioned principle: for example, for the sensor installed above the front left wheel on the vehicle body, the selected direction should make the acceleration variation of the vehicle when down acceleration occurred (such as when the vehicle is running on a flat road, the front left wheel fall into a pothole suddenly) conform with the acceleration variation trend of the vehicle (for example, both of the acceleration variations are negative) when speed-down (for example, braking suddenly) or the vehicle body accelerate on the right side (such as the vehicle turn right or list to left), this is because under these situations, the relative shock absorbing device should always enhance the supporting force, namely, the absorbing device will elongate but not shorten. Similarly, when the vehicle accelerate suddenly or turn left or the front left wheel pass by a convex roadblock, the acceleration variation detected by the sensor is positive, the relative shock absorbing device should always reduce the supporting force, namely, the absorbing device will shorten but not elongate. When selecting the installation direction of the sensor based on the above foresaid principle, if in a 3D Coordinate System, axes Z represents vertical direction that plumb with the ground level, axes X represents east and axes Y represents north, then the acceleration sensor above the front left wheel is fixed adown and partial to northwest, the sensor above the front right wheel is fixed adown and partial to northeast, the sensor above the back left wheel is fixed adown and partial to southwest, and the sensor above the back right wheel is fixed adown and partial to southeast.

Figure 2:
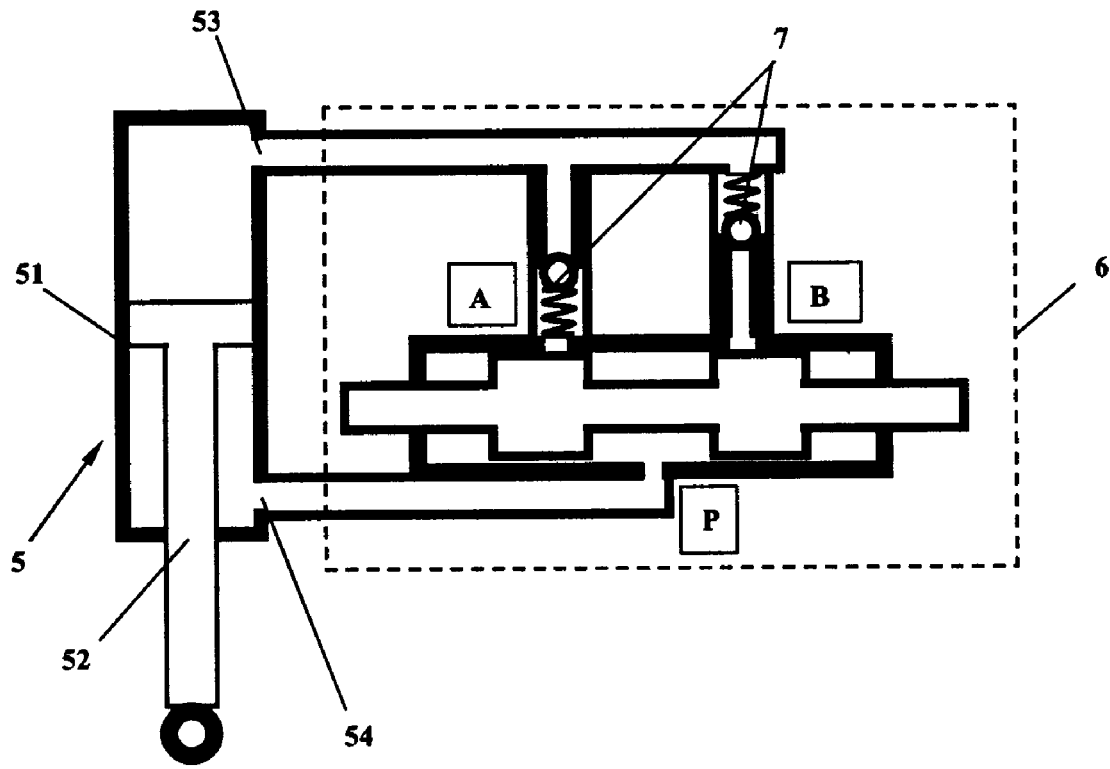
FIG. 2 illustrates the electromagnetic valve of the shock absorbing system that is in blocked status.

As shown in FIG. 1 to FIG. 4, the retractable shock absorbing device comprises a cylinder extension device 5, which includes air cylinder extension device, or hydraulic extension device, or hydro-pneumatic extension device (as the cylinder is a common knowledge, the following description refers to an air cylinder extension device only); a three-position two-way electromagnetic valve 6 that connected with the upper and lower air outlets 53, 54 of the air cylinder extension device 5, and a check valves 7 with different pass direction respectively deposited in the channel A, B of the electromagnetic valve 6. The air cylinder 51 of the air cylinder extension device 5 is fixed on the vehicle body, and the piston 52 thereof is connected with the wheels to adjust the space between the wheels and the vehicle body, thus to adjust the highness of the vehicle. The electromagnetic valve 6 is connected between the upper and lower air outlets 53, 54 of the air cylinder 51, and in one embodiment, two channels (channel A and channel B) of the electromagnetic valve 6 are connected with the upper outlet 53, and one channel P is connected with the lower outlet 54. Two check valves 7 with different pass directions are deposited in the channels A and B respectively. When the mandrel of the electromagnetic valve 6 is in central, as shown in FIG. 2, the liquid or air inside the valve is resting, and the retractile status of the shock absorbing device keeps unchanged also, therefore the highness of the vehicle keeps unchanged; When the mandrel of the electromagnetic valve 6 moved to the right side for a little place, the liquid or air inside the valve is restricted to move from channel P to channel B only (as the broken line shown in FIG. 3), thus the retractable shock absorbing device can elongate only and can not shorten under the outside force (normally, the outside force is the power of vibration between wheels and vehicle body to push the piston 52 move down), to ensure the highness of the vehicle keep unchanged and do not go-down. And when the mandrel of the electromagnetic valve 6 moved to the left side for a little place, the liquid or air inside the valve is restricted to move from channel A to channel P only (as the broken line shown in FIG. 4), thus the retractable shock absorbing device can shorten only and can not elongate under the outside force (normally, the outside force is the power of oscillation between wheels and vehicle body to push the piston 52 move up), to ensure the highness of the vehicle keep unchanged and do not run-up.

The working principle of the present invention is further illuminated as below: setting the direction of the sensors according to the foresaid principle, the acceleration sensor fixed above the front left wheel on the body is adown and partial to northwest, the sensor above the front right wheel on the body is adown and partial to northeast, the sensor above the back left wheel is adown and partial to southwest, and the sensor above the back right wheel is adown and partial to southeast. When running, if the vehicle moving straight with constant speed and the moving status is very smooth, all the detected variation of the acceleration vectors on each directions should be zero, that is, the variation of the total acceleration is zero, then the IPCD will set the retractile status of the absorber as un-elongate and un-shorten, the space between the wheels and vehicle body as well as the highness of the vehicle will keep unchanged, and the vehicle will keep moving smoothly; but actually there should be a little bumpy or wallow when the vehicle is running, on these conditions, the IPCD will slowly set the retractile status of the retractable absorber according to the vehicle highness signal detected by the highness sensor, and use the power of vibration between the wheels and the body of the vehicle to adjust the elongate or shorten length of the absorber, to keep the required vehicle highness. If one of the sensors detects a negative variation of the acceleration, namely the acceleration is decreased, that means the relevant suspension of the vehicle body need be enhanced, the IPCD will adjust the corresponding absorber to elongate to avoid the relevant highness of the vehicle body from going down; and if one of the sensors detects a positive variation of the acceleration, namely the acceleration is increased, that means the relevant suspension of the vehicle body need be weakened, the IPCD will adjust the corresponding absorber to shorten to avoid the relevant highness of the vehicle body from running-up, thus the vehicle body will keep smoothly moving, without nutation or lift, without list, and without wallow. As there always has a little bumpy or wallow when the vehicle is running, that is to say, there always have a little vibration between the wheels and vehicle body, the IPCD will control the relevant absorber at any time by adjusting the retractile length to elongate, shorten or un-elongate and un-shorten respectively, thus to control the highness of the vehicle and absorb the shock.

When working, four highness sensor of the system that detect the relevant highness between the wheel and vehicle body will provide the highness signal to the SCM, the SCM will then adjust the open or close status of the related electromagnetic valve according to different burthen on each wheel, and under the power of vibration between the wheels and the body of the vehicle to slowly adjust the retractile status of the absorber to keep the vehicle with the required highness.

When running, the road information of concave or convex is detected by the acceleration sensors that fixed on the body above each wheel, and transmitted to the SCM. The SCM will A/D transform the signals with sufficient frequency, and get the information that whether the road is concave or convex and the degree thereof from the transformed results, then the system will adjust the retractile status of the absorber by the electromagnetic valve, and use the power of vibration between the wheels and the body of the vehicle to run-up, go-down or keep the highness of the relevant wheel unchanged, thus to keep the vehicle running smoothly.

And if the vehicle suddenly turning, starting or braking, the acceleration will alter correspondingly, with the same rule, the acceleration variation will be detected by the sensors above the four wheels and transmitted to the SCM, the SCM will then control the retractable shock absorbing device by the electromagnetic valve to adjust the wheel in time to cause the wheel only run-up or only go-down, till the acceleration variation above the four wheels detected by the acceleration sensors is equal or near to zero, thus to keep the vehicle running smoothly.

In order to have more comfortability and safety when the vehicle is turning at high speed, the highness of the vehicle body on the inboard side should be little lower and the highness on the outboard side be little higher. When turning, the transverse acceleration vectors with opposite directions are detected by the sensors on the right and left side of the vehicle, and transmitted to the SCM. The SCM will analyze each signal to see if there always has right about acceleration on right and left side simultaneity, thus to determine whether the vehicle is turning or not; if turning, the SCM will control to set the inboard side absorber to shorten and the outboard side absorber to elongate, thus to improve the stability, comfortablity and safety of the vehicle. With the same rule, the nutation or lift angle of the vehicle can be adjusted also.

If any one of the acceleration sensors on the body above the wheels detects the variation of the acceleration trend to or keep zero, SCM will slowly control the electromagnetic valve to keep the highness of the relevant wheel unchanged, according to the foresaid acceleration signal. The highness value of the vehicle can be predefined manually or automatically to satisfy the requirements of both safety and passing ability.

Figure 3:
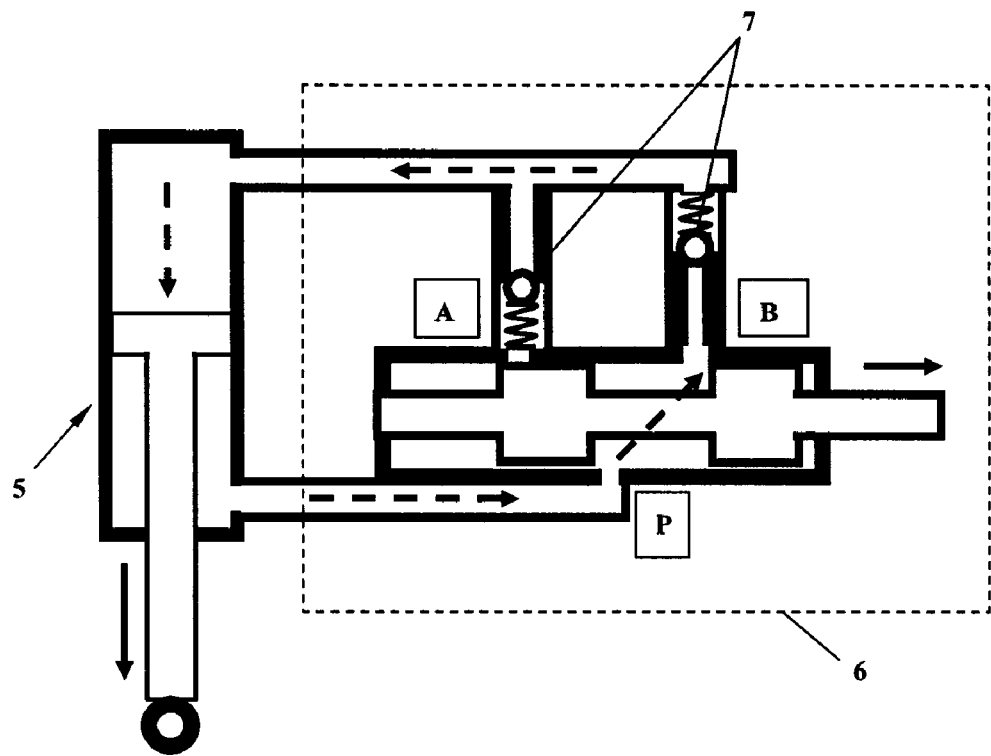
FIG. 3 illustrates the shock absorbing device in only elongate status after the mandrel of the electromagnetic valve has moved to right side for a little space.
Figure 4:
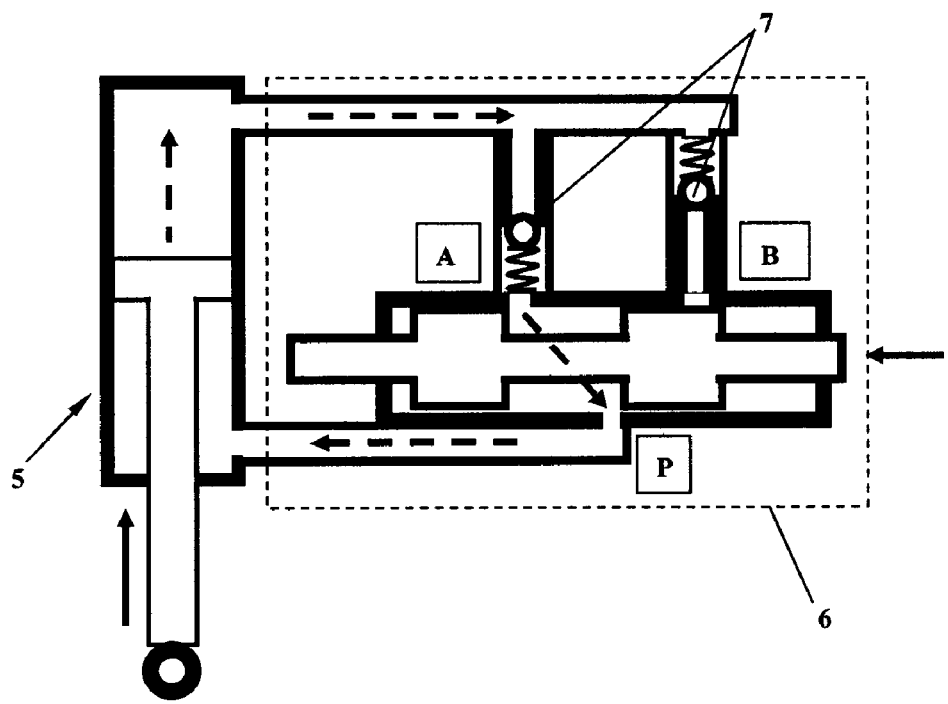
FIG. 4 illustrates the shock absorbing device in only shortening status after the mandrel of the electromagnetic valve has moved to the left side for a little space.

How the system keeps the vehicle running smoothly when turning or running on a bumpy road will be illuminated as following:

As shown in FIG. 5, when the vehicle turning right, the whole vehicle body accelerates towards the right side, the signal variation detected by the sensor on the left side is negative, and the signal variation of the right side is positive, under the control of the SCM IPCD 3 of the system, the electromagnetic valve 6 works to set the absorber on the left side to only elongate, as shown in FIG. 3, therefore keeps the left side of the vehicle not go-down; and at the same time the absorber on the right side is set to only shorten, as shown in FIG. 4, therefore keeps the right side of the vehicle not run-up, and the whole body of the vehicle will keep balance. On this moment, as the acceleration vector on the transverse direction is not equal to zero, the acceleration variation detected by the sensor on the left side is still negative and on the right side is positive, and the absorber on the left side still is elongated and the right side is shortened. As the vibration always exists between the wheel and vehicle body, the vibration forces the absorber keep elongating on the left side and shortening on the right side, therefore the vehicle highness on the left side is increased and the highness on the right side is decreased, thus the stability, comfortablity and safety of the vehicle are improved.

As the direction of the acceleration sensors also will change if the vehicle is listed, the acceleration vector on the transverse direction will change towards to zero, the inclination of the vehicle body will be restricted in a particular range of angle, and at the same time, the highness sensor can be used to restrict the inclination also. Similarly, when the vehicle turning left, the working procedures of the sensors and the absorbers on the left and right side will reverse to the above mentioned.

As shown in FIG. 6 to FIG. 9 (the absorbing springs are not shown in the figures), when the vehicle is running from left to right on a flat road at a constant speed (as shown in FIG. 6), the signal received by the IPCD 3 shows the acceleration level is equal to or trend to zero, then the absorber is set to un-elongate and un-shorten by the control of the IPCD 3 according to the signals from the acceleration sensors 2, the highness of the vehicle is kept unchanged; but actually there always have a little bump or wallow when the vehicle is running, on these conditions, the IPCD will use the power of vibration between the wheels and the body of the vehicle to adjust the elongate or shorten length of the absorber, to keep the vehicle with the predetermined highness. If one wheel touches on a gibbous object (as shown in FIG. 7), the acceleration variation detected by the sensor 2 on this wheel is positive, and is transmitted to the IPCD 3. The IPCD 3 will control the electromagnetic valve 6 to make the absorber shortening, and the piston retracts to shorten the length of the shock absorber, thereby the wheel is lifted up to decrease the acceleration variation on the vehicle body. During this process, the IPCD 3 detects the value and direction of the vertical acceleration continuously and compares it with the acceleration value when the vehicle is stopped. If the values are equal or approached, the IPCD 3 will control the absorber to un-elongate and un-shorten, and the vehicle highness will keep unchanged. When one wheel is passing on a gibbous object (as shown in FIG. 8), the IPCD 3 will receive a negative signal of the acceleration variation, and control the electromagnetic valve 6 to set the absorber elongating, the piston 52 move down to overcome the variation of the acceleration, until the detected acceleration value is equal to or trend to zero. If the vehicle runs on a concave road, the working procedures of the IPCD and the absorbers will reverse to the procedure when it passing on a gibbous object. In order to avoid the electromagnetic valve working frequently, there has two thresholds for the IPCD to feedback the variation of the acceleration, if the variation is tiny, the IPCD will not set the valve to act; and for the great variation, the IPCD will restrict the motion range of the valve cooperated with the sensor on the corresponding position on the vehicle body.

The principle of the electronic shock absorbing system provided in the present invention is simple, and no additional power of the vehicle is needed, the criterion on the road conditions and treatment thereof are unique, that is, when the acceleration variation detected by the vertical acceleration sensor above one wheel on the vehicle body is positive, the relevant absorber is controlled only to shorten but not elongate; and when the acceleration variation detected by the vertical acceleration sensor is negative, the relevant absorber is controlled to only elongate but not shorten, thus to realize shock absorbing. And at the same time, the system adjusts the relative space between the wheels and vehicle body by using the power of vibration thereof. When the detected acceleration variation is equal to or trend to zero, the IPCD will control the retractile status of the absorber according to the comparing of the highness signal with the required highness, and use the power of vibration between the wheels and the body of the vehicle to make the vehicle highness trend to the required one. As compare with other suspension systems, the present invention greatly decreases the type and number of the sensors, the system is suitable for all kinds of road conditions, makes the vehicle not wallop or wallow even running on a bad road, and improve the stability and security; the present system/method presents better performance than or equal to other shock absorbing systems under all kinds of road conditions, it is a simple but more better system.

What is claimed is:

1. A method for electronic shock absorbing by controlling the retractile status of a retractable absorber, comprising the steps of:

S1. fixing an acceleration sensor at a predetermined direction and angle on a vehicle body position that above the retractable absorber, then detecting a resultant vector of an acceleration vector along the vertical direction and an acceleration vector along the longitudinal and a transverse directions of the vehicle body above the retractable absorber during running;

S2. processing signals from the acceleration sensor by an information processing and controlling device (IPCD) and setting a retractile status of the retractable absorber according to the processing result;

S3. according to the retractile status set in S2, adjusting the retractable absorber to keep a variation of the acceleration sensor retaining or trending to zero.

2. The method of claim 1, wherein in the step S2 if the signal transmitted from the acceleration sensor shows the acceleration variation is positive, the retractile status of the retractable absorber is set to shorten; if the signal from the acceleration sensor shows the acceleration variation is negative, the retractile status of the retractable absorber is set to elongate; and if the signal from the acceleration sensor shows the acceleration variation retains or trends to zero, the retractile status of the retractable absorber is set to un-shorten and un-elongate.

3. The method of claim 2, wherein said step S1 further comprising a step of fixing a highness sensor on the vehicle body to detect a variation signal of highness of the vehicle; and then in said step S2, if the signal from the acceleration sensor shows the acceleration variation retains or trends to zero, the IPCD slowly sets the retractile status of the retractable absorber according to the acceleration signal and the highness signal and adjusts the retractile length of the retractable absorber utilizing the power of vibration between wheels and the vehicle body to keep the vehicle with required highness.

4. The method of claim 2, wherein the retractable absorber is set to only shorten by getting through a down check valve of a three-position two-way electromagnetic valve inside the retractable absorber; the retractable absorber is set to only elongate by getting through an up check valve of the three-position two-way electromagnetic valve; and the retractable absorber is set to un-shorten and un-elongate by setting the three-position two-way electromagnetic valve to block its channels.

5. The method of claim 1, wherein the method further comprising a step S4: controlling the retractile status of the retractable absorber by the IPCD to absorb the shock of a vehicle, thus to avoid or decrease the harmful list and nutation or lift, at the same time adjusting the retractile length of the retractable absorber utilizing the power of vibration between the wheels and the vehicle body to realize the adjustment of the highness and inclination of the vehicle.

6. The method of claim 5, wherein said step S1 further comprising a step of fixing a highness sensor on the vehicle body to detect a variation signal of highness of the vehicle, and then in the step S4, the shock absorbing is achieved by, transmitting the vehicle highness signal from the highness sensor to the IPCD, then the IPCD adjusting the retractile status of the retractable absorber, and at the same time, adjusting the retractile length of the retractable absorber utilizing the power of vibration between the wheels and the vehicle body, thereby the highness and gradient of the vehicle is adjusted; or the shock absorbing is achieved by, further fixing a speed sensor on the vehicle to detect a speed signal in step S1, then transmitting the speed signal to the IPCD to adjust the retractile status of the retractable absorber according to the road condition information expressed by the speed signal and the acceleration signal, and at the same time, adjusting the retractile length of the retractable absorber by the power of vibration between the wheels and the vehicle body to adjust the highness of the vehicle automatically.

* * * * *